US005531247A

United States Patent [19]

Borst et al.

[11] Patent Number: 5,531,247

[45] Date of Patent: Jul. 2, 1996

[54] TEMPERATURE AND PRESSURE RESISTANT SHUTOFF VALVE

[75] Inventors: Ronald W. Borst, Kansas City; Donald R. David, Raytown, both of Mo.

[73] Assignee: Clay and Bailey Manufacturing Company, Kansas City, Mo.

[21] Appl. No.: 267,572

[22] Filed: Jun. 28, 1994

[51] Int. Cl.[6] .............................. F16K 31/32; F16K 33/00

[52] U.S. Cl. .......................... 137/447; 141/198; 251/283; 251/309

[58] Field of Search .................................... 137/445, 447, 137/450; 251/304, 309, 312, 315.01, 315.16, 283, 315.08, 315.09, 315.10, 315.12, 315.14; 141/198

[56] References Cited

U.S. PATENT DOCUMENTS

| | | | |
|---|---|---|---|
| 351,087 | 10/1886 | Bean | 251/309 |
| 565,730 | 8/1896 | Foote | 251/309 |
| 610,242 | 9/1898 | Poage | 251/283 |
| 948,519 | 2/1910 | Neal et al. | 137/447 |
| 1,783,441 | 12/1930 | Lewis | 251/283 |
| 1,796,808 | 3/1931 | Roberts | 251/283 |
| 3,148,695 | 9/1964 | Groen, Jr. et al. | 251/309 |
| 3,211,420 | 10/1965 | Hartmann | 251/309 |
| 3,218,024 | 11/1965 | Kroekel | 251/283 |
| 3,233,865 | 2/1966 | Panzica et al. | 251/309 |
| 3,314,643 | 4/1967 | Sicknik | 251/309 |
| 3,347,516 | 10/1967 | Linde | 251/309 |
| 3,443,593 | 5/1969 | Colombo | 251/283 |
| 3,656,713 | 4/1972 | Walton | 251/309 |
| 3,893,469 | 7/1975 | Baker | 251/309 |
| 4,103,868 | 8/1978 | Thompson | 251/283 |
| 4,193,578 | 3/1980 | Brumm | 251/283 |
| 4,986,320 | 1/1991 | Kesterman et al. | 137/445 |
| 5,207,241 | 5/1993 | Babb | 137/447 |

FOREIGN PATENT DOCUMENTS

| | | | |
|---|---|---|---|
| 1218828 | 6/1966 | Germany | 251/309 |
| 0052469 | 3/1986 | Japan | 251/309 |

*Primary Examiner*—George L. Walton
*Attorney, Agent, or Firm*—Hovey, Williams, Timmons & Collins

[57] ABSTRACT

The float-controlled shutoff valve has an upright flow passage controlled by a transverse valve spool rotated between open and closed positions by the float in response to changing levels of liquid within the holding tank. The spool has a deep, generally U-shaped, diametrically extending cavity on one side and a single, solid sidewall on the opposite side, the cavity being so formed that it presents a cross-flow inlet approximately one quarter turn away from the passage blocking surface of the sidewall. Hence, when the spool is in its open position during filling, the cavity is vertically flow-aligned with the passage while the blocking sidewall is disposed alongside the passage, and when the spool is in its closed position the blocking sidewall spans the passage above the horizontally disposed cavity to prevent fluid movement past the spool. As the spool leaves its open position and commences progressive rotation toward its closed position, the large void area of the cavity and its lack of sidewall structure in opposition to the blocking sidewall avoids the presentation of a deflecting or impinging surface against which the flow can bear as it moves through the spool, thus avoiding the creation of a countervailing force tending to reopen the valve. Special geometric relationships between the valve body and the spool, as well as a special manner of journaling the spool for rotation relative to the body, minimize leakage past the spool itself and at the journal points, while also promoting rapid filling.

15 Claims, 4 Drawing Sheets

*Fig. 18.*
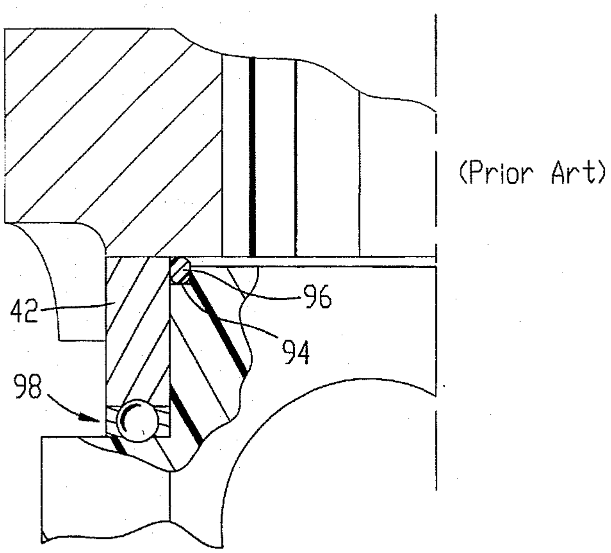
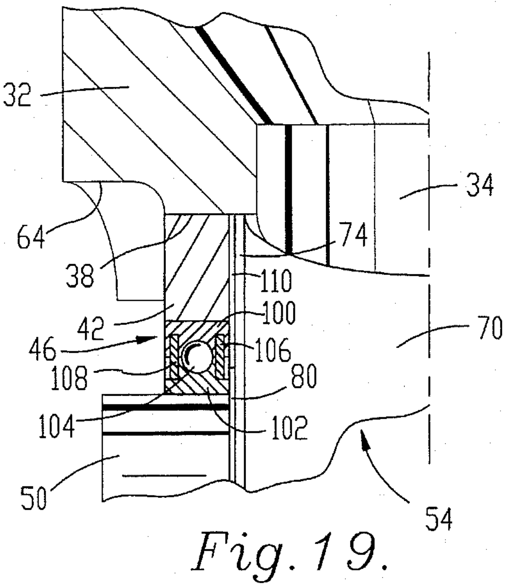
*Fig. 19.*
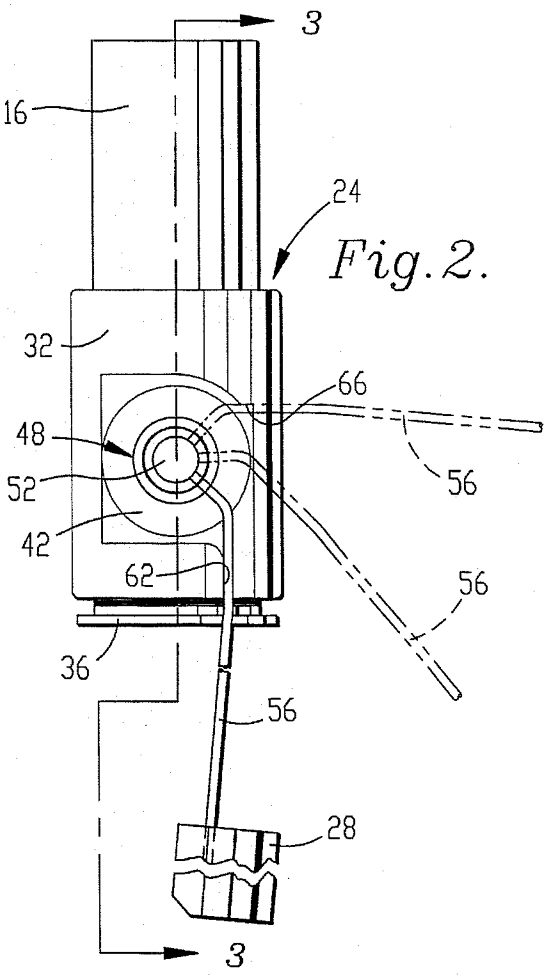
*Fig. 2.*
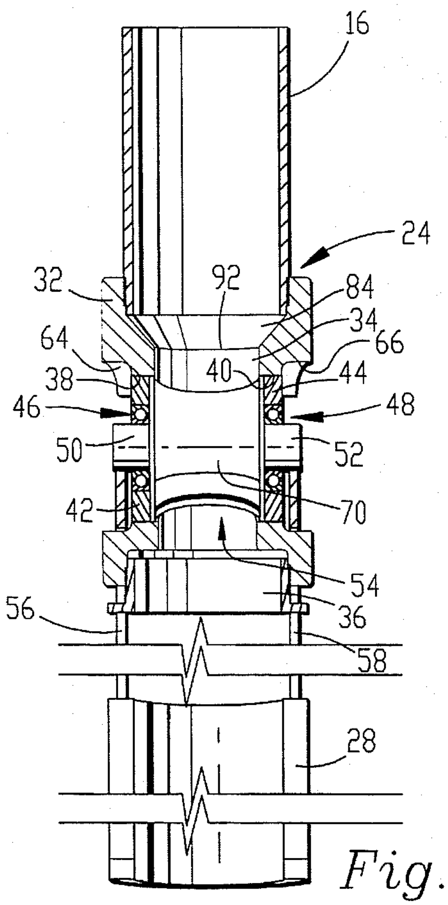
*Fig. 3.*

TEMPERATURE AND PRESSURE RESISTANT SHUTOFF VALVE

TECHNICAL FIELD

The present invention relates to the field of liquid storage tanks such as those used for the containment of gasoline and other fuels and, more particularly, relates to a shutoff valve especially adapted for use in connection with above ground storage tanks which are typically filled under relatively high pumping pressures. Shutoff valves of this type must be responsive to the increasing level of liquid in the tank during the filling procedure so as to shutoff automatically when the liquid reaches the desired fill point.

BACKGROUND

Liquid level responsive shutoff valves are not new per se. See for example Babb 5,207,241. However, it has been found that the Babb valve as disclosed in the '241 Patent has a number of shortcomings which make it unsuitable for conditions in which the valve is exposed to relatively high or low ambient temperatures. Leakage can occur in and around the journal points of the valve spool under such extreme temperatures, particularly when high pressures are also attendant, and the valve spool itself may fail to completely close off the inlet passage in the valve body when the valve is supposed to be shutoff, thus causing over filling of the tank and spillage. The synthetic resinous spool of the Babb valve undergoes dimensional changes at a different rate than the main metallic body of the valve during exposure to extreme temperatures, thus causing the spool to bind up in the valve body and fail to open or close as the case may be. Resilient, elastomeric O-rings at opposite ends of the spool are intended to prevent leakage at such locations but actually become expanded under pressure and temperature extremes so as to abrade against adjacent stationary surfaces and undergo preliminary wear, leading to excessive leakage.

Furthermore, due to the fact that the valve spool has a crossbore that is axially aligned with the flow passage in the valve body when the spool is in its open position, the crossbore functions as a confining orifice through which the liquid must flow in order to reach the tank. As the spool is rotated toward a closed position in response to a float sensing the rising liquid level in the tank, the crossbore is moved progressively out of alignment with the passage to reduce the volume of liquid that can pass into the tank. As such closing rotation progresses, one inner wall of the crossbore rotates from a vertical disposition toward a horizontal orientation on the bottom side of the crossbore. This has the effect of introducing an obstruction or impingement surface in the path of fluid flow which produces a force tending to counteract the action of the float attempting to rotate the spool into its closed position. Consequently, while the float tries to close the valve and shutoff additional inflow, the high pressure inflow works against the interior impingement surface of the crossbore and tries to keep the valve open. If the supply pressure is high enough, the valve simply cannot close and the tank will overfill.

In an effort to reduce this countervailing force generated by the pressurized incoming flow, the Babb valve provides a relief notch in the lower, downstream edge of the crossbore so that the pressurized flow moving across such downstream edge when the spool has moved out of a fully open position exerts less counterrotating force against the spool than would otherwise be the case. However, it has been found that under certain conditions the spool with the relief notch in the crossbore closes prematurely. Moreover, the crossbore itself restricts the rate of volume flow of liquid through the valve such that the tank filling procedure takes longer than is desirable. It is also an important object to eliminate restrictions in the valve which limit the rate of volume flow, and to provide a construction which eliminates premature shutoff of the valve.

SUMMARY OF THE PRESENT INVENTION

Accordingly, it is one important object of the present invention to provide a float-controlled, spool-type shutoff valve that overcomes the deficiencies and shortcomings of prior spool-type shutoff valves, including the valve disclosed in Babb 5,207,241. In this respect, an important object of the present invention is to provide a shutoff valve which permits rapid filling of the tank at high pressures, yet positive and reliable shutoff when the liquid level reaches the desired point of fill. Another important object is to accomplish the foregoing under adverse temperature extremes and to do so without leakage at the journal points of the spool or past the spool itself and into the tank when the valve is supposed to be shutoff. A further important object of the invention is to provide a valve in which the inflow rate accepted by the spool valve is maintained at an acceptably high level during the gradual rotation of the spool valve toward the closed position so as to avoid prolonging the filling procedure during the last stages of fill, hence reducing the total elapsed time involved in filling the tank.

In carrying out the foregoing and other important objects, the present invention departs from the principles of previous spool valves by eliminating the restrictive crossbore of the spool and reconfiguring the spool so that one side of the spool is provided with a deep, transversely U-shaped, crossflow cavity through which the incoming liquid passes when the valve is open. The opposite side of the spool has a single sidewall of adequate dimensions to fully span and thus block off the inlet end of the passage through the valve body when the spool is in its closed position. When the spool is rotated to its open position, the cavity is brought into alignment with the passage so as to present an open and unobstructed pathway directly through the valve body from top to bottom. As the cavity is progressively rotated out of alignment with the passage in the valve body during actuation by the float, the solid sidewall of the spool moves gradually into its blocking relationship across the passage, but the cavity which has been rotated down toward the bottom of the spool is completely free of obstructing walls or deflecting surfaces that can be impinged upon by the pressurized liquid rushing through the spool, thus avoiding the creation of any counteracting force tending to hold the valve open.

The main passage through the valve body is offset slightly with respect to the axis of rotation of the spool so that, when the spool is in its closed position with the arcuate sidewall thereof spanning the passage, there is a significant amount of additional surface area of the sidewall yet unexposed and extending laterally beyond the passage to provide additional interfacing overlap between the spool sidewall and the adjacent passage surfaces to discourage leakage past the spool. Offsetting the passage in this manner and elongating the passage laterally in the area which is the last to become closed off provides continued rapid liquid flow past the spool during the later stages of the filling procedure.

The spool itself is preferably constructed of a metallic substance such as aluminum, rather than a synthetic resinous material as in the Babb valve. Furthermore, in lieu of the elastomeric O-rings of the Babb construction, the spool of the present invention has no O-rings at all and prevents leakage at the journal points of the spool through the use of sealed bearings at such locations. A shallow step on each end wall of the spool at the base of the spindle thereof abuts the inner race of the bearing assembly at that location to provide operating clearance between the outer race of the assembly and the adjacent end wall of the spool.

BRIEF DESCRIPTION OF THE DRAWINGS

FIG. 2 is an enlarged side elevational view of the shutoff valve with the float in a fully lowered position corresponding to an open position of the spool, other positions of the float being illustrated in phantom lines;

FIG. 3 is a vertical cross-sectional view through the valve taken substantially along line 3—3 of FIG. 2;

FIG. 18 is a fragmentary vertical cross-sectional view of a prior art valve showing the bearing and elastomeric seal arrangement utilized in such prior construction; and FIG. 19 is a fragmentary vertical cross-sectional view of the valve of the present invention in the area adjacent one end spindle of the spool illustrating the manner in which a sealed bearing assembly and a special sealing and spacing step are utilized at that location to prevent leakage.

DETAILED DESCRIPTION

Figure 1:
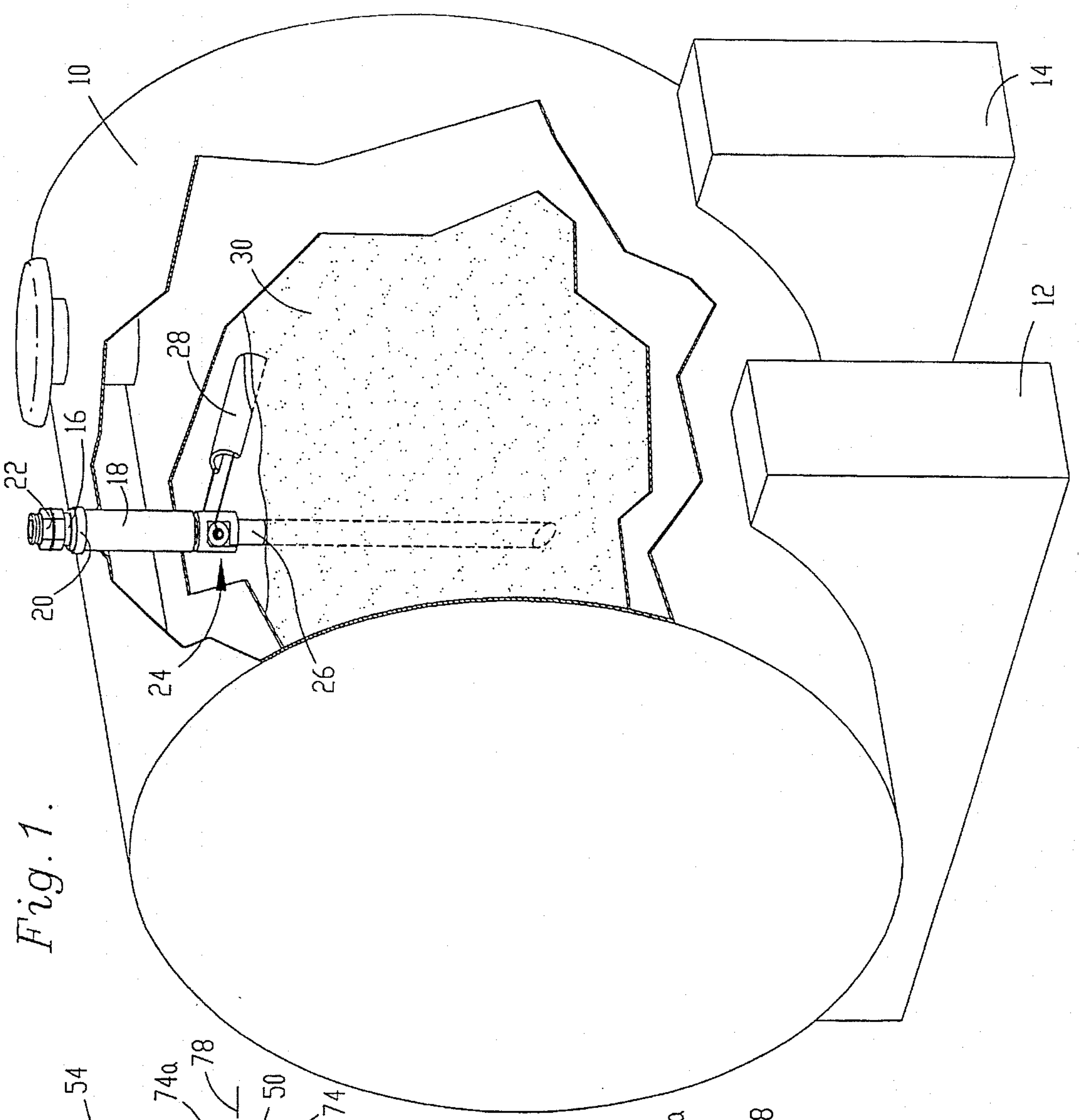
FIG. 1 is an isometric view of an above ground liquid storage tank utilizing a float-controlled shutoff valve constructed in accordance with the principles of the present invention.

The storage tank 10 in FIG. 1 is carried above the ground by a pair of saddle blocks 12 and 14, or other suitable structure. A fill tube 16 is received within an upright, fixed nipple 18 on the tank 10, such fill tube 16 having an adjustable stop collar 20 adjacent its upper end which bears against the nipple 18 to determine the extent to which the fill tube 16 projects into the interior of the tank 10. A dry break coupler 22 or other standard coupling well known to those skilled in the art is fixed to the upper end of the fill tube 16 and is adapted to receive a mating coupling (not shown) on the discharge end of a high pressure supply hose associated with a gasoline tanker truck or the like, as is well understood by those skilled in the art. A float-controlled shutoff valve 24 in accordance with the present invention is secured to the lower end of the fill tube 16 a short distance below the nipple 18, and valve 24 carries a drop tube 26 which projects downwardly from the valve 24 to a location close to the bottom of the tank 10 for discharging the incoming liquid into the tank. Thus, a liquid supply path is defined by the fill tube 16, the valve 24 and the drop tube 26, such path being opened and closed by virtue of the valve 24 which has a float 28 that responds to the level of liquid 30 accumulating within the tank 10 to maintain the valve 24 either open or closed.

As illustrated in FIGS. 2 and 3, for example, the valve 24 includes a tubular valve body 32 preferably constructed of anodized aluminum. An elongated, upright flow passage 34 extends the full length of the body 32 from top to bottom thereof, the passage 34 being counterbored at its upper end and internally threaded so as to threadably receive the lower end of the fill tube 16. Correspondingly, the lower end of the passage 34 is enlarged and may be internally threaded to receive an annular clamp nut 36 used to secure the upper end of the drop tube 26 to the valve body 32.

The valve body 32 is generally cylindrical in overall configuration. A horizontal, transverse bore through the body 32 intersects the passage 34 to create a valve chamber 37 having an upstream end **37*a* and a downstream end 37*b*. The bore also causes a pair of horizontally aligned holes 38 and 40 to be presented on opposite sides of the body 32. Depending upon the size of the valve and the diameter of the holes 38, 40, such holes may receive and securely retain a pair of stationary support rings 42 and 44 that carry respective bearing assemblies 46 and 48 for the spindles 50 and 52 of a rotary valve spool 54 that opens and closes the passage 34 depending upon the rotative position of the spool 54. Such positioning of the spool 54 is controlled by the float 28 of conventional construction which has a pair of arms 56 and 58 respectively coupled with the outer ends of the spindles 50 and 52. As illustrated particularly in FIG. 2, the float 28 can be raised and lowered between the solid line position in which the float is down below the valve body 32 and an approximate three (3) o'clock raised position in which the float would be positioned off to one side of the valve body 32. When the float 28 is in the lowered position, the arms 56, 58 come to rest against respective stops 60 and 62 on the outside of the housing 32, while when the float 28 is fully raised, the arms 56, 58 are limited by the upper shoulders 64 and 66, also on the outside of the housing 32**.

Details of construction of the bearing assemblies 46, 48 and the support rings 42, 44 will be explained later. Suffice it to point out for the moment that the bearing assemblies 46, 48 and the support rings 42, 44 journal the valve spool 54 for rotative motion between its open and closed positions and that the leakage and premature wear problems associated with prior units have been eliminated.

Figure 5:
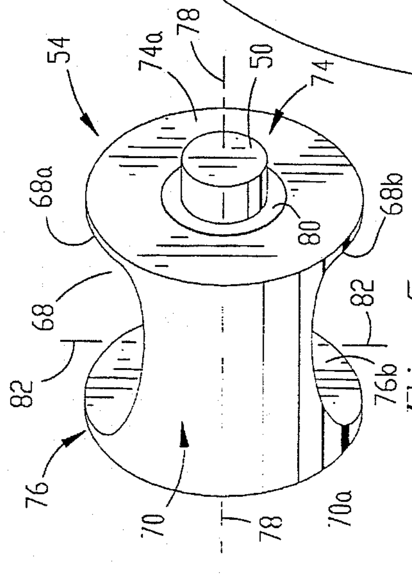
FIGS. 4 and 5 are enlarged, front and rear perspective views respectively of the unique spool of the present invention, showing the cross-flow cavity on one side of the spool and the blocking sidewall on the opposite side of the spool.
Figure 4:
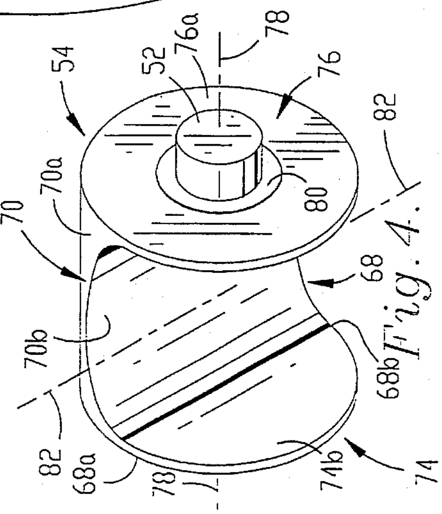
Figure 6:
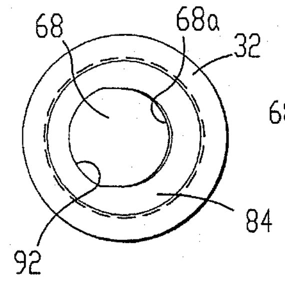
FIGS. 6, 7 and 8 are top plan views of the valve illustrating the spool in a fully open position in FIG. 6, a partially closed position in FIG. 7, and a fully closed position in FIG. 8.

With respect to the spool 54 itself, the overall configuration and construction of such component is illustrated in FIGS. 4 and 5, for example. As illustrated in those figures, the spool 54 is generally cylindrical in overall configuration, with the exception that one side of the spool has a deep, generally U-shaped, cross-flow cavity 68 while the opposite side of the spool has a solid, arcuate sidewall 70 that defines part of the cylindrical overall profile of the spool. Sidewall

70 has an outwardly facing, arcuate exterior wall surface 70*a*. A pair of circular end walls 74 and 76 are disposed at opposite ends of the spool 54 and are structurally interconnected by the sidewall 70. The end walls 74, 76 have flat exterior surfaces 74*a* and 76*a* from which the spindles 50 and 52 project. The common central axis 78 of the spindles 50, 52 comprises the axis of rotation of the spool 54, and the end walls 74, 76 themselves are concentric about such axis 78. Each of the end walls 74, 76 is also provided with a very thin (on the order of 0.010") annular step 80 that circumscribes the corresponding spindle 50 or 52 at the base thereof to work in cooperation with the bearing assemblies 46 and 48 as will be subsequently described.

Figure 17:
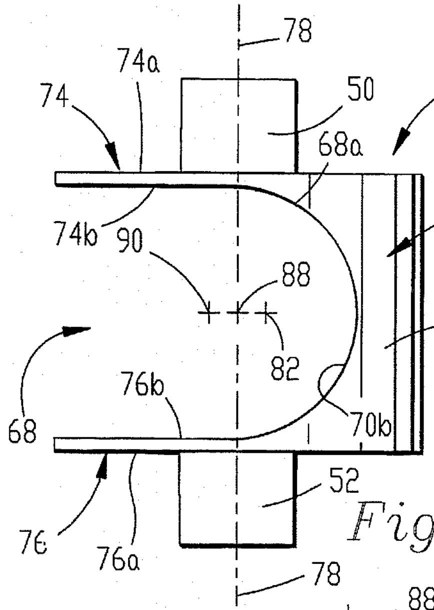
FIG. 17 is an enlarged top plan view of the spool in its fully open position corresponding to that of FIG. 12, such view being enlarged to illustrate various eccentric relationships of portions of the spool.

The cross-flow cavity 68 has a longitudinal axis 82 extending through the body of the spool 54 in a direction transverse to the axis of rotation 78. The sides of the cavity 68 are defined by opposite interior flat surfaces 74*b* and 76*b* of the end walls 74 and 76, such interior surfaces 74*b* and 76*b* extending generally parallel to one another deeply into the spool body to a point slightly past the axis of rotation 78 as illustrated in FIG. 17. At the point of inward termination of the surfaces 74*b*, 76*b* such surfaces join with the arcuately concave interior surface 70*b* of the sidewall 70. As shown in FIG. 17, and also FIGS. 4 and 5, the interior surface 70*b* of sidewall 70 forms part of an imaginary cylinder with its center axis 82 inboard of and at right angles to the axis of rotation 78. The surface 70*b* forms the bight of the cavity 68 and the two interior end wall surfaces 74*b* and 76*b* form the two legs of the cavity. As a result of the particularly deep extension of the cavity 68 into the body of the valve spool 54 toward the sidewall 70 and the fact that it extends across the full diameter of the spool, the opposite ends 68*a* and 68*b* of the cavity 68 serve as an inlet and an outlet respectively for liquid moving through the spool. The sidewall outer surface 70*a* wraps or extends around the cylindrical profile of the spool 54 for approximately only 90 degrees of the entire circumferential extent thereof.

Figure 7:
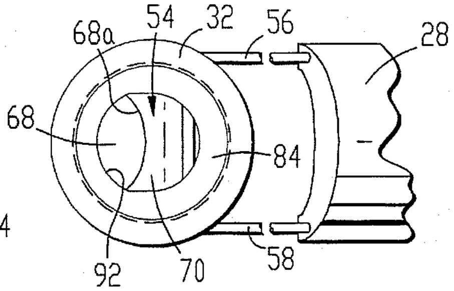
Figure 8:
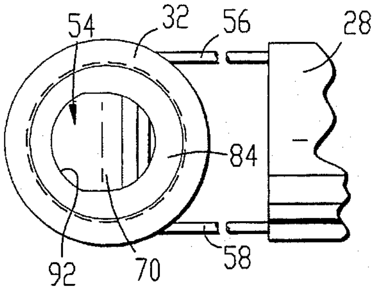
Figure 9:
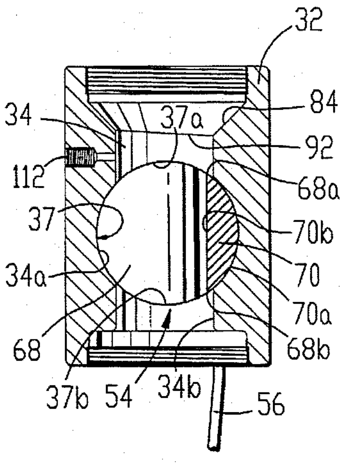
FIGS. 9, 10 and 11 are vertical cross-sectional views through the valve with the spool in fully open, partially closed and fully closed positions corresponding to FIGS. 6, 7 and 8.
Figure 10:
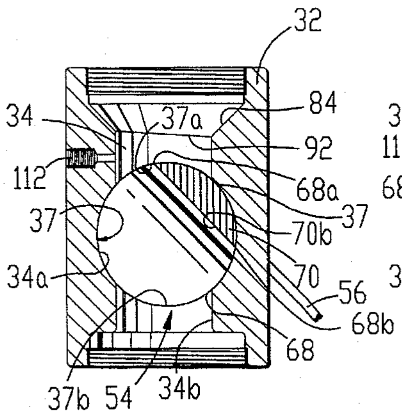
Figure 13:
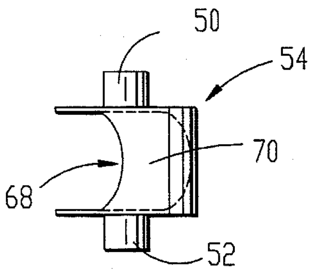

As illustrated in FIGS. 6–14, the spool 54 is carried within the valve body 32 in such a manner that the spool 54 is rotated between positions opening and closing the passage 34, depending upon the position of the float 28 which actuates the spool 54. The spool 54 is rotatable through 90 degrees of rotation between its open position of FIGS. 6, 9 and 12, and its closed position of FIGS. 8, 11 and 14. FIGS. 7, 10 and 13 show the spool 54 in a partially closed position.

When the spool 54 is in its open position, the opposite ends 68*a* and 68*b* of the cavity 68 are disposed in fluid flow alignment with the passage 34. The sidewall 70 is disposed generally alongside of the passage 34.

Figure 11:
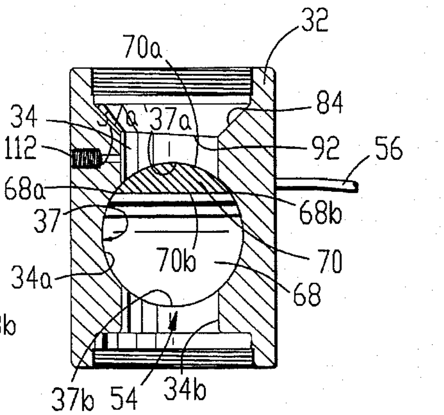
Figure 12:
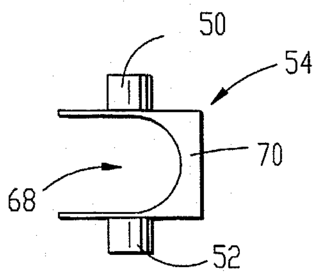
FIGS. 12, 13 and 14 are top plan views of the spool in its fully open, partially closed and fully closed positions corresponding to the positions illustrated in FIGS. 6–11.

When the valve spool 54 is in its closed position of FIG. 11, the cavity 68 extends transverse to the passage 34 with the sidewall 70 at the upstream end 37*a* of chamber 37 overlying the cavity 68 and spanning the passage 34 so as to close passage 34.

When the spool is in an intermediate, partially closed position as in FIG. 10, the upper end 68*a* of the cavity 68 is still partially flow aligned with the passage 34 so as to permit continued liquid flow through the valve body. The sidewall 70 is partially across the upstream end 37*a* of the chamber 37. As illustrated in FIG. 10, the lack of wall structure on the spool 54 in opposition to the single sidewall 70 provides an absence of obstructing surfaces to the liquid flow once it has entered the upper end 68*a* of the cavity. The sidewall 70 is dimensioned and related to the passage 34 in such a way that at all points between the full open position of FIG. 9 and the full closed position of FIG. 11, there is no hinderance to fluid flow from structure in the spool that presents impingement structure for the fluid once it has entered the spool.

Figure 16:
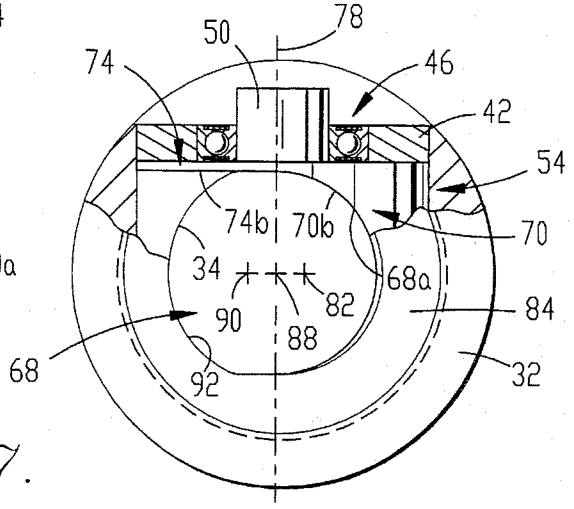
FIG. 16 is an enlarged top plan view of the valve with a portion broken away to reveal details of construction beneath the upper end of the valve.
Figure 15:
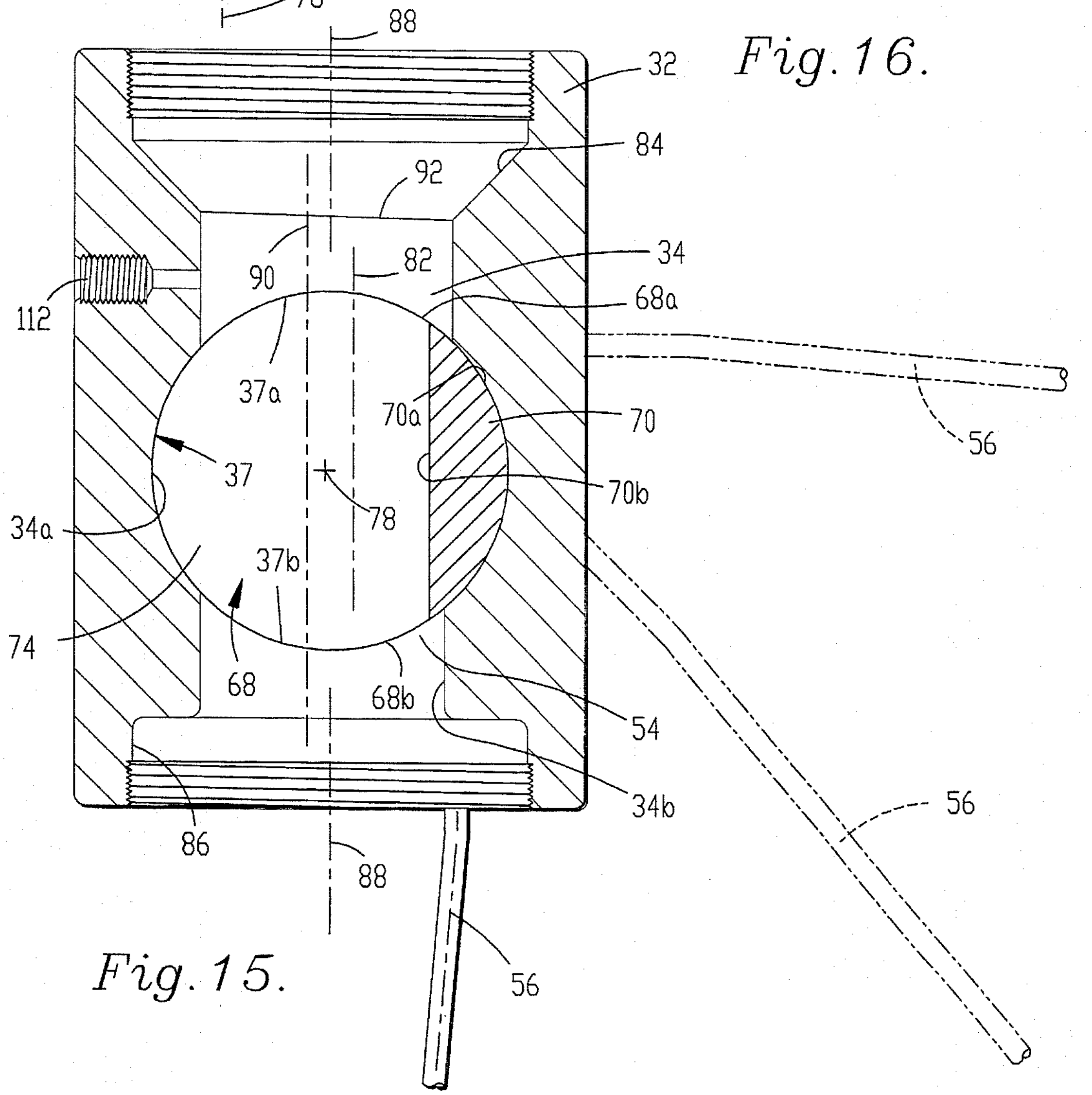
FIG. 15 is a vertical cross-sectional view through the valve with the spool in the full open position with the view being enlarged to illustrate the eccentric relationships of various portions of the valve.

FIGS. 15, 16 and 17 are intended to show the various geometric relationships between the valve body 32, the spool 54, and the pathways through those components. With initial reference to FIG. 15, it will be seen that the passage 34 in the main part of the body 32 is preceded by an upstream inlet 84 in the body and is succeeded by a downstream outlet 86 in the body. As earlier described, the inlet 84 threadably receives the fill tube 16 while the outlet 86 threadably receives the clamp nut 36 securing the drop tube 26 to the valve 24.

The inlet 84 and the outlet 86 share a common longitudinal axis 88, which also lies in the same vertical plane as the axis of rotation 78 of the spool 54. However, the passage 34 has its longitudinal axis 90 offset from the axis 88 toward the rear of the valve body, which is in a direction generally away from the sidewall 70 of the spool when the spool is in its open position. By virtue of the fact that the passage 34 is slightly eccentric with respect to the inlet 84 and outlet 86, the line of intersection 92 between the inlet 84 and the passage 34 is elliptical as viewed from the top as partially shown in FIG. 16 and as shown completely in FIGS. 6, 7 and 8. The intersection between the outlet 86 and passage 34 is circular when viewed from the bottom. FIG. 17 shows that the center point 82 for the arcuate bight surface 70*b* or the sidewall 70 is offset to the right of the axis of rotation 78 of the spool, such center point 82 also being visible in FIG. 16. These relationships help provide an extra amount of overlap between the front wall 34*b* and the tailing end of the sidewall 70 of spool 54 when the spool 54 is in its fully closed position as in FIG. 11, thus helping to seal the interface between the spool and valve body at that location. On the other hand, this relationship also helps keep the upper end 68*a* of cavity 68 open longer to the admittance of incoming fluid from the passage 34 as the float rises and begins rotating the spool as illustrated in FIG. 10 toward its closed position. Consequently, the rate of flow is not unduly restricted at that time, even though the shutoff point is fast approaching, all of which provides faster overall fill time inasmuch as the final portion of that procedure is not needlessly prolonged.

FIGS. 18 and 19 illustrate the difference between a prior method of journaling the spool 54 and the method of the present invention. As illustrated in FIG. 18, the prior art arrangement utilized a synthetic resinous spool of DELRIN. Each end of the spool was provided with an annular groove 94 which accepted an elastomeric O-ring 96. A bearing assembly 98 pressed into the retaining support ring 42 circumscribed the spindle of the spool to rotatably support the spindle.

In the present invention, the spool 54 is preferably constructed from the same anodized aluminum material used for the valve body 32 so that both of those components expand and contract to the same extent when temperature differentials are encountered. Taking one end of the spool as an example, the support ring 42 is tightly pressed into the hole 38 (if ring 42 is needed) so as to remain stationary when the spool 54 is rotated. The bearing assembly 46 is in turn pressed into the ring 42 such that the outer race 100 of the bearing assembly is effectively fixed to the ring 42. On the other hand the inner race 102 is slipped onto the spindle 50 and normally rotates with the latter relative to the outer race 100, as permitted by the series of ball bearings 104 captured between the inner and outer races 102, 100. A pair of annular, liquid and pressure tight seals 106 and 108 on opposite sides of the bearing assembly bridge the interface between the inner and outer races 102, 100 and are recessed or at least flush with the corresponding inner and outer faces of the bearing assembly. The inner race 102 rests upon and abuts against the annular seat or step 80 that circumscribes the spindle 50, such step 80 projecting no further radially outwardly on the exterior surface 76*a* of the end wall 76 than the inner race 102, such that the outer race 100 does not physically contact the step 80. Consequently, although the spindle 50, inner race 102, step 80 and spool 54 all rotate together, the outer race 100, support ring 42 and valve body 32 remain stationary during such movement of the spool. Furthermore, a narrow annular clearance gap 110 of the same thickness as the step 80 becomes defined between the end surface 76*a* of end wall 76 and the outer race 100 and ring 42 so as to avoid frictional engagement between the spool 54 and such components during movement of spool 54 between its open and closed positions. Hence, there is no opportunity for the spool 54 to seize or freeze up at that location.

Operation

The manner of operation of the valve 24 should be apparent from the foregoing description. Suffice it to point out, therefore, that during the high pressure filling cycle, the valve 24 is normally disposed in the condition illustrated in FIGS. 6, 9 and 12 wherein the valve spool 54 is in its open position. Cavity 68 is fully aligned with the passage 34 at this time and the sidewall 70 is disposed generally alongside of the passage 34 so as to permit rapid filling.

As the liquid level within the tank 10 reaches the float 28, the float begins to rise, causing the spool 54 to be rotated counterclockwise viewing FIG. 9 so that the sidewall 70 begins to extend across the passage 34 as illustrated in FIGS. 7, 10 and 13. Although the entry into the lower part of the passage 34 thus becomes somewhat restricted at this time, it will be seen that once the liquid is past the upper end 68*a* of the cavity 68, there is no obstruction, confinement or impingement surface below that point presented by the spool 54. Consequently, the liquid rushing through the cavity produces no force within the spool tending to reopen the spool 54 in a direction counteracting the opening force of the float 28. It also fails to produce forces tending to cause premature shutoff of the valve and avoids restrictions that would tend to reduce the rate of volume flow through the valve.

Figure 14:
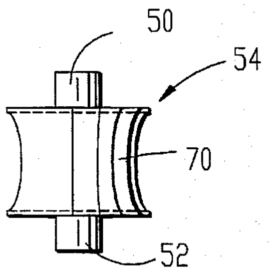

Hence, as the float continues to rise, the spool 54 simply progressively continues to rotate toward its closed position of FIGS. 8, 11 and 14, until such fully closed position is finally reached, at which point the incoming flow is shut off. Thereafter, the operator may turn off the pump at the truck and disconnect the fill hose, relieving the pressure in the fill tube 16 and allowing a check valve (not shown) within a drain line 112 to open and discharge the head of liquid above the spool 54 in the fill tube 16 and upper portion of the passage 34. Such check valve and drain line 112 are conventional and well understood by those skilled in the art.

It will be appreciated that because of the offset or eccentric relationship between the passage 34 and the axis of rotation 78 of the spool 54, the top of the spool represented by the sidewall 70 when the spool is in its closed position seals very well against adjacent interior surfaces of the valve body 32. This is important not only to prevent unintended continued filling of the tank after the full level has been reached, but also in maintaining a good seal during wave action within the tank, which jostles the float 28 and tends to rock the spool back and forth as the closed position is approached, and even thereafter. Furthermore, this offset relationship helps assure continued rapid filling of the tank even as the shutoff point is approached, thus shortening the overall amount of time required to accomplish the filling procedure.

Furthermore, it will be appreciated that the present design avoids the problem of premature shutoff that was sometimes observed in connection with the Babb valve constructed in accordance with U.S. Pat. No. 5,207,241. By virtue of the large, open cavity design of the spool, the inherent restrictions of a crossbore through the spool are avoided, as are the problems associated therewith.

Additionally, it will be noted that the bearing arrangement provided for journaling the spool 54 is important in providing freedom of rotation of the spool at all times, even under extreme high and low temperature conditions, and in the avoidance of leakage during high pressure filling. By virtue of the step 50, adequate clearance is maintained between the opposite ends of the spool 54 and the support rings 42, 44, while also providing a metal-to-metal seal with the inner race 102 of the bearing assembly 46, 48. The inner and outer seals 106 and 108 associated with each bearing assembly 46, 48 are also important in preventing leakage. Preferably, such bearings 46, 48 are sealed ball bearings available, for example, from Micro Miniature Bearing, Co. of Old Bridge, N.J. Preferably, a TEFLON-thickened, fuel-resistant grease having sodium chromate corrosion inhibitors is used. One suitable grease is "Royco 13" grease available from Royal Lubricants of Parsippany, N.J.

It is also preferred that the float 28 be higher in density than the Babb float. Whereas the Babb float at a density of 0.0049 lbs. per cubic inch, the float 28 of the present invention has a density of 0.01096 lbs. per cubic inch.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a float-controlled shutoff valve for a generally upright supply tube disposed within the interior of a liquid storage tank, the improvement comprising:

a tubular valve body adapted to be mounted on the tube and having an elongated, internal passage therethrough disposed for liquid flow communication with the tube and the tank when the body is mounted on the tube, said passage having a valve chamber provided with an upstream end and a downstream end;

a valve spool located within said chamber, extending across said passage and supported by the body for rotation about a transverse axis between open and closed positions, said spool having a cross-flow cavity extending through one side thereof and a single, solid sidewall on the opposite side thereof, said sidewall having an interior surface defining the boundaries of the cavity, and said cavity extending transverse to said axis of rotation, said cavity being disposed in liquid flow alignment with the passage and said sidewall being disposed generally along-side the passage when the spool is in said open position, said cavity being disposed out of liquid flow alignment with the passage and said sidewall being disposed across the passage at the upstream end of the chamber generally above the cavity to block liquid flow past the valve spool when the spool is rotated to said closed position, said spool being open and unobstructed on said one side thereof in the area of said cavity regardless of the position of said spool; and a float operably coupled with said spool for progressively rotating the spool into said closed position as the liquid being supplied through the supply tube rises to a predetermined level in the tank, the direction of rotation of the valve spool during movement from the open position to the closed position being such that the cavity becomes progressively less exposed as said sidewall of the spool moves across the passage generally in the same direction as liquid passing through the unobstructed cavity to thereby eliminate counteracting forces acting on said spool and within said cavity.

2. In a shutoff valve as claimed in claim 1, said single sidewall having an interior surface defining the bight of the channel, said interior surface being arcuate about an axis which is transverse to the axis of rotation of the spool.

3. In a shutoff valve as claimed in claim 2, said axis of curvature of the interior surface of the sidewall being spaced to one side of the axis of rotation of the spool.

4. In a shutoff valve as claimed in claim 3, said spool having a pair of opposite end walls interconnected by said sidewall, said end walls having substantially flat interior surfaces that intersect said arcuate interior surface of the sidewall.

5. In a shutoff valve as claimed in claim 4, said opposite end walls having circular external surfaces, said circular external surfaces of the end walls being concentric with said axis of rotation of the spool.

6. In a shutoff valve as claimed in claim 5, said sidewall having a generally cylindrical exterior surface that is concentric with said axis of rotation of the spool.

7. In a shutoff valve as claimed in claim 1, said cavity having an inlet end and an outlet end, said inlet and outlet ends being of the same size and shape.

8. In a shutoff valve as claimed in claim 1, said valve body having an upper circular inlet adapted to be coaxially aligned with said inlet tube when the valve body is mounted on the tube, said spool having its transverse axis of rotation lying in the same vertical plane as the center line of said upper inlet of the valve body, said passage through the valve body being transversely circular with a longitudinal axis which is slightly laterally offset from the common vertical plane of the center line of the inlet and the axis of rotation of the spool, said longitudinal axis of the passage being offset generally toward said one, open side of the spool when the spool is in said open position.

9. In a shutoff valve as claimed in claim 8, said sidewall of the spool having an interior, arcuately concave surface forming the bight of said channel, said concave interior surface having a center axis which is slightly laterally offset from the axis of rotation of the spool in a direction toward said sidewall.

10. In a shutoff valve as claimed in claim 9, said center axis of the concave interior surface of the sidewall extending generally parallel to the longitudinal axis of the passage when the spool is in its open position.

11. In a shutoff valve as claimed in claim 1, said spool having a pair of spindles projecting axially outwardly from opposite ends of the spool, said valve body having a pair of annular bearing assemblies rotatably receiving opposite ones of said spindles, each of said bearing assemblies including an inner race rotatable with the corresponding spindle and an outer race which is stationary with the valve body during rotation of the spool between its open and closed positions, said spool having a pair of opposite end walls provided with exterior surfaces facing respective ones of said bearing assemblies, each of said end walls having a relatively thin, annular step circumscribing the corresponding spindle and abutting the inner race of the corresponding bearing assembly whereby to space the outer race of the assembly sufficiently out of contact with the outer surface of the end wall as to provide clearance for rotation of the spool between its open and closed positions.

12. In a shutoff valve as claimed in claim 11, each of said bearing assemblies having an annular, pressure and liquid resistant seal spanning the inner and outer race of the assembly and facing the corresponding end wall of the spool.

13. In a shutoff valve as claimed in claim 11, said valve body having a pair of spaced, circular and axially aligned holes on opposite sides of said passage concentric about said axis of rotation of the spool, each of said holes having one of said bearing assemblies received therein, each of said bearing assemblies being smaller in diameter than the corresponding hole and being provided with an annular support ring circumscribing the bearing assembly in firm, holding relationship with the outer race thereof, each of said support rings being securely retained within a corresponding hole against rotation with the spool.

14. In a shutoff valve as claimed in claim 13, said valve body and said spool being constructed from metallic material.

15. In a shutoff valve as claimed in claim 11, said valve body and said spool being constructed from metallic material.

* * * * *